United States Patent [19]
Barclay et al.

[11] 4,167,308
[45] Sep. 11, 1979

[54] ELECTROCHROMIC DISPLAY DEVICE

[75] Inventors: Donald J. Barclay, Olivers Battery; Colin L. Bird, Fair Oak; Anthony C. Lowe, North Baddesley, all of England

[73] Assignee: International Business Machines Corporation, Armonk, N.Y.

[21] Appl. No.: 877,220

[22] Filed: Feb. 13, 1978

[30] Foreign Application Priority Data

Apr. 19, 1977 [GB] United Kingdom ............ 16259/77

[51] Int. Cl.² .............................................. G02F 1/17
[52] U.S. Cl. ................................................... 350/357
[58] Field of Search ....................................... 350/357

[56] References Cited

U.S. PATENT DOCUMENTS

| | | | |
|---|---|---|---|
| 3,453,038 | 7/1969 | Kissa et al. | 350/357 |
| 3,712,709 | 1/1973 | Kenworthy | 350/357 |

Primary Examiner—James W. Davie
Attorney, Agent, or Firm—Joseph E. Kieninger

[57] ABSTRACT

An electrochromic display device has an improved counter electrode arrangement. The device has a plurality of display elctrodes and a counter electrode in contact with a first electrolyte of a primary redox system. The counter electrode is charged to a predetermined potential. A secondary redox system is associated with the primary redox system. A secondary electrode in the secondary redox system is electrically connected to the counter electrode to maintain the charge on the counter electrode at a predetermined potential.

4 Claims, 2 Drawing Figures y 4,167,308

ELECTROCHROMIC DISPLAY DEVICE

DESCRIPTION

1. Technical Field

It is a primary object of this invention to provide an improved electrochromic display device.

It is another object of this invention to provide an electrochromic display device with an improved counter electrode arrangement.

It is still another object of this invention to provide an electrochromic display device with a counter electrode that is maintained at a predetermined potential.

2. Background Art

For the purposes of this specification an electrochromic display device is a device wherein the display effect is achieved as a consequence of a redox reaction caused by the passage of charge between a display electrode and a counter electrode both in contact with a suitable electrolyte. An example of an electrochromic display device is given in British Pat. No. 1,376,799 wherein the electrolyte includes heptyl viologen dications. Upon reduction at the display electrode, a purple film which is insoluble in the electrolyte is deposited on the display electrode. Oxidation at the display electrode returns the dications to the electrolyte. Thus, by providing a plurality of display electrodes and selectively energizing them, a required display can be generated. Other materials can be used. Development has taken place of displays which employ redox reactions of inorganic materials, such as tungstic oxide, to achieve the display effect. This invention is of application to any electrochromic display.

In our copending application Ser. No. 877,219, filed Feb. 13, 1978, the problem of erasure is discussed and it is shown that a charged counter electrode is desirable in an electrochromic display. The invention of the copending application resides in providing an opaque charged counter electrode on the inner face of the viewing surface of an electrochromic display panel. There is provided, however, no means for replenishing or maintaining the charge on the counter electrode should the charge be dissipated during the lifetime of the display device.

In U.S. Pat. No. 3,961,842, an electrochromic display is described which uses as active ingredients in the electrolyte an n-heptylviologen dication and a dihydrogen phosphate anion. The counter electrode is of palladium hydride, which is stated to be a nonpolarizable electrode which maintains a threshold voltage while providing charge transfer for the redox reaction. Effectively, the counter electrode is a half cell reacting at constant potential irrespective of applied e.m.f. The Specification discloses that the effectiveness of the half cell decreases with use and proposes a regeneration electrode of palladium or lead in contact with the electrolyte. After a specified number of erase-write cycles of the display and counter electrodes an external battery is switched across the regeneration and counter electrodes. This is stated to regenerate the coulombic capacity of the counter electrode by the deposition of palladium hydride. Regeneration, it is disclosed, can also be initiated by measuring the internal impedance of the cell.

BRIEF DESCRIPTION OF DRAWINGS

In the accompanying drawings forming a material part of this disclosure.

DISCLOSURE OF INVENTION

For further comprehension of the invention, and of the objects and advantages thereof, reference will be had to the following description and accompanying drawings and to the appended claims in which the various novel features of the invention are more particularly set forth.

According to the invention an electrochromic display device includes a plurality of display electrodes and a counter electrode, all in contact with a first electrolyte, the arrangement being such that the counter electrode is charged to a predetermined potential, characterized in that the device incorporates a secondary redox system continuously responsive to the potential at the counter electrode by means of a secondary electrode electrically connected to the counter electrode, and arranged to transfer charge to the counter electrode, whereby the charge on the counter electrode is maintained at the predetermined potential.

Figure 1:
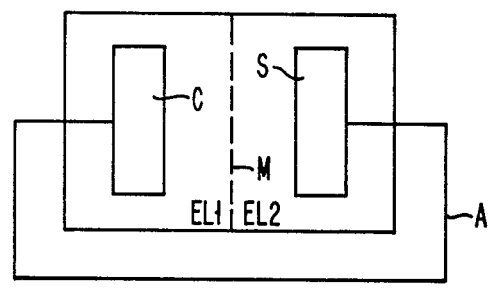
FIG. 1 is a schematic diagram illustrating the electrochemical aspects of the invention.

Referring to FIG. 1, which is merely illustrative of the electrochemistry underlying the invention, a counter electrode C is immersed in an electrolyte EL1 while the secondary redox system responsive to the potential of the counter electrode consists of an electrode S and an electrolyte EL2. Electrode S is connected to counter electrode C by a conductor A and the electrolytes EL1, EL2 are separated by an ion exchange membrane which permits electrical contact between the electrolytes but does not permit interdiffusion. The membrane can be any of a number of well-known ion exchange media, such as the proton exchange membrane Nafion (Trademark of Du Pont), the selectively chargeable membrane Permaplex (Trademark of Permutit Company), or the mixed sodium-aluminum oxide known as $\beta$-alumina.

In our copending application Ser. No. 877,219 it is proposed that the counter electrode C could be charged either by trapping charge at the counter electrode surface, for example by trapping an $Fe^{II}/Fe^{III}$ system in the pores of an anodized $Al_2O_3$ layer on the counter electrode, or alternatively, by treating the counter electrode as symmetrical with the display electrode so that erasure of the display electrode is accompanied by writing at the counter electrode, and vice-versa. Since analysis of the latter arrangement is simpler than in the case of charge trapping it will be used to explain operation of the system of FIG. 1. Also, by way of example, heptyl viologen is assumed to be the active medium in electrolyte EL1, the colored species deposited on the display electrode by a write operation being heptyl viologen cation radicals.

The potential of counter electrode C is determined by the amount of heptyl viologen cation radical deposited on the counter electrode. The potential is a maximum when a monolayer of this material is deposited and thereafter remains constant. The reaction at the counter electrode leading to deposition is that of reduction. Should the potential at the counter electrode fall due to loss of the deposited species, this is sensed at electrode S by means of conductor A and an oxidation occurs in the secondary redox system S/EL2.

$$S - ne^- \rightarrow S^{n+}$$

A compensating reduction takes place at the counter electrode $$nV^{++} + ne^- \rightarrow nV^+$$

leading to the deposition of heptyl viologen cation radicals and the recharging of the counter electrode. Although current flow between C and S is very small, the combined resistance of the electrolytes and the membrane is not negligible, so that the consequent voltage drop is not insignificant. For the reaction to proceed at an adequate rate, the potential difference between C and S must be sufficient to overcome this voltage drop. Fine control of the rate of recharging can be achieved by providing a variable resistor in conductor A.

It will in general be the case that a number of reactions will occur at an electrode at increasing potentials. It is therefore necessary to fix an upper limit to the potential difference between C and S to ensure that only the desired reaction takes place.

In the case of heptyl viologen, there are two reactions with respective potentials $V_1$ and $V_2$. The reaction with the lower potential $V_1$ is the required reaction, since the other reaction $V_2$ leads to undesirable side effects.

Another point to note about the secondary redox system including electrode S is that in the case of an electrochromic display including viologen, the redox reaction at electrode S is oxidation, which implies that S must be of such material or size as will last the expected lifetime of the display device. It is possible that S could be designed to be replaceable, but the problems of preventing contamination of the display system, especially by oxygen, during such replacement are such that it is preferred to design S to last the lifetime of the display device.

Electrolyte EL2 can be liquid or a gel or dispersed within a porous medium. Suitable redox couples for use with heptyl viologen are provided by $Cd/Cd^{II}$, $In$-$/In^{III}$, or $Sn/Sn^{II}$. The electrodes S are of cadmium, indium or tin, respectively, with the electrolyte EL2 containing as active ingredient the other member of the couple with an appropriate counter ion.

An extra advantage of the arrangement shown is that it acts as an oxygen scavenger within the electrolyte EL1. As has already been pointed out, with viologen materials the deposit on the counter electrode is heptyl viologen cation radicals. Any free oxygen in the electrolyte is reduced by the deposit. This may cause a loss of potential which is sensed by the redox couple S/EL2 with consequent recharging of the counter electrode. The scavening of free oxygen at the counter electrode keeps the oxygen attach on the deposit on the display electrodes to a minimum and so lengthens the time a display can be left without the application of external power.

Best Mode for Carrying out the Invention

Figure 2:
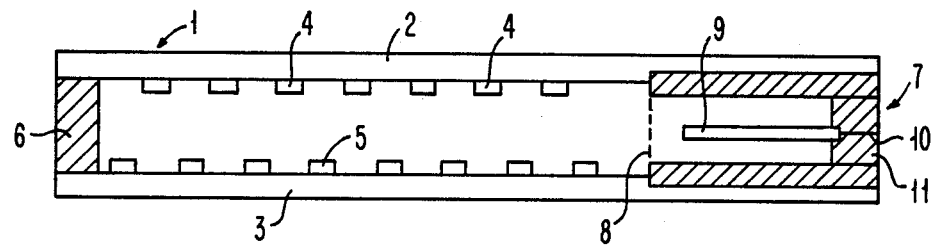
FIG. 2 is a diagrammatic section through a device according to the invention.

FIG. 2 is a schematic cross-section through an electrochromic display device according to the invention which has a counter electrode of the shape described in our copending application Ser. No. 877,219. For clarity, the thickness of the device is exaggerated. The device consists of two relatively thick plates 2, 3, of glass or other suitable material, at least plate 3 being transparent. On plate 2 is deposited an array of display electrodes 4, which may be dot-shaped and arranged in rows and columns to form a matrix. Electric connection to the display electrodes 4 is made through plate 2. An array of thin film transistor switches (not shown) may be provided on the side of plate 2 remote from the display electrodes 4, or, if the spacing of the display electrodes permits, individual conductors may be led to the edge of plate 2 where they can be connected to drive circuitry. The counter electrode 5 is deposited on plate 3 and is in the shape of a pattern of lines such as a rectangular grid. Electric connection to counter electrode 5 is by way of a conventional edge connection (not shown). Plates 2, 3 are sealed together along three sides by sealing glass 6 or any other suitable hermetic material. The fourth side is occupied by the secondary redox system 7 which is a rectangular tube with one side being a membrane 8 of an ion exchange medium, as described above. The tube is filled with an electrolyte and the other member of the redox couple is a foil or plate electrode 9. A conductor 10 connects the electrode 9 and the edge connection of counter electrode 5. A variable resistor (not shown) can be incorporated in conductor 10, if required for control of the rate of reaction, as mentioned above. Plates 2 and 3 are preferably reduced in thickness, as shown, to receive the secondary redox system which is sealed to the plates. The design may be such as to permit removal of the electrode 9, as for example, making the electrode 9 and the wall 11 of the rectangular tube an integral removable unit. The secondary redox system 7 should not be seen by a user of the display device and may be masked by a frame surrounding and supporting the display device or by making the rectangular tube, or the portion of plate 3 overlying the tube, opaque.

Industrial Applicability

The invention is not restricted to the particular design of display device shown. The display electrodes 4 may be differently shaped and arranged, for example, they may have the form of the figure-of-eight characters used in watches and hand calculators. The counter electrode 5 need not be of the shape disclosed in our copending application referred to and may also be located on plate 2. For example, it may be a hollow rectangle on plate 2 completely surrounding the display electrodes.

In contrast, with the regeneration technique proposed in U.S. Pat. No. 3,961,842, our invention provides continuously active apparatus which does not interfere with normal operation of the display device and which constantly maintains the counter electrode at a given potential. It is emphasized that the invention is not restricted to the particular form of charged counter electrode disclosed in our copending application referred to above, which was concerned with solving the counter electrode problem presented by large electrochromic display devices, although the solution was applicable to all electrochromic display devices. This invention is applicable also to devices which provide satisfactory operation with the counter electrode at the side of, or in the same plane as, the display electrodes, such as are disclosed in U.S. Pat. No. 3,961,842.

Although the invention has been described as embodied in systems wherein the reaction at the secondary electrode is oxidation and that at the counter electrode is reduction, it is to be understood that the invention is equally applicable to a system having the opposite polarities.

While I have illustrated and described the preferred embodiments of my invention, it is to be understood that I do no limit myself to the precise constructions herein disclosed and the right is reserved to all changes and modifications coming within the scope of the invention as defined in the appended claims.

Having thus described my invention, what I claim as new, and desire to secure by Letters Patents is:

1. An electrochromic display device comprising:

a first redox system containing a first electrolyte, a counter electrode in contact with said first electrolyte, said counter electrode containing a material that undergoes a reversible redox reaction in said first electrolyte at a known potential, a plurality of display electrodes in contact with said first electrolyte, a second redox system separated from said first redox system by an ion exchange membrane, and a third electrode in said second redox system and being electrically connected to said counter electrode wherein the charge of said counter electrode is maintained at said known potential.

2. A device as described in claim 1 wherein said second redox system includes a second electrolyte that is separated from said first electrolyte by an ion exchange member.

3. A device as described in claim 2, wherein the first electrolyte includes as active ingredient heptyl viologen dications.

4. A device as described in claim 2 or claim 3, wherein the secondary redox system includes a redox couple selected from the group consisting of $Cd/Cd^{II}$, $In/In^{III}$ and $Sn/Sn^{II}$.

* * * * *